(12) United States Patent
Matthews, III et al.

(10) Patent No.: US 11,028,933 B2
(45) Date of Patent: Jun. 8, 2021

(54) VALVE SEAL ASSEMBLY

(71) Applicant: Emerson Vulcan Holding LLC, St. Louis, MO (US)

(72) Inventors: Kenneth Heidt Matthews, III, Kingwood, TX (US); Kevin Lewis Swicegood, Missouri City, TX (US)

(73) Assignee: Emerson Vulcan Holding LLC, St. Louis, MO (US)

( * ) Notice: Subject to any disclaimer, the term of this patent is extended or adjusted under 35 U.S.C. 154(b) by 95 days.

(21) Appl. No.: 16/254,306

(22) Filed: Jan. 22, 2019

(65) Prior Publication Data

US 2020/0232573 A1  Jul. 23, 2020

(51) Int. Cl.
*F16K 25/00* (2006.01)
*F16K 1/226* (2006.01)

(52) U.S. Cl.
CPC .......... *F16K 25/005* (2013.01); *F16K 1/2266* (2013.01)

(58) Field of Classification Search
CPC .... F16K 25/005; F16K 1/2057; F16K 1/2071; F16K 1/226; F16K 1/2263; F16K 1/2265; F16K 1/2266
See application file for complete search history.

(56) References Cited

U.S. PATENT DOCUMENTS

| | | | |
|---|---|---|---|
| 4,005,848 A | 2/1977 | Eggleston | |
| 4,210,313 A | 7/1980 | Chester | |
| 4,513,765 A * | 4/1985 | Rishovd | F16K 1/2263 137/72 |
| 4,655,462 A | 4/1987 | Balsells | |
| 5,984,316 A | 11/1999 | Balsells | |
| 6,224,064 B1 | 5/2001 | St. Germain | |
| 6,264,205 B1 | 7/2001 | Balsells | |
| 7,225,825 B1 * | 6/2007 | Hartman | F16K 1/2263 137/15.25 |
| 2014/0203201 A1 | 7/2014 | Kinser | |

FOREIGN PATENT DOCUMENTS

GB   2031124 A   4/1980

* cited by examiner

*Primary Examiner* — Michael R Reid
(74) *Attorney, Agent, or Firm* — Quarles & Brady LLP

(57) ABSTRACT

An arrangement for providing a seal for a valve is provided herein that can include a seat having an anchor portion, a connection portion extending radially from the anchor portion, and first and second sealing elements extending from opposing sides of the connection portion. First and second energizers can be respectively arranged on opposing sides of the connection portion and can be respectively positioned between the first and second sealing elements and the anchor portion of the seat. First and second retainers can be respectively positioned between the first and second energizers and the anchor portion of the seat on opposing sides of the connection portion.

18 Claims, 13 Drawing Sheets

VALVE SEAL ASSEMBLY

BACKGROUND

Valve designs can employ various seal assemblies therein. The seal assemblies can be configured to assist an obturator in inhibiting flow through the valve when the valve is placed in a closed position. Therefore, a seal assembly that increases seal integrity within the valve may be desired.

SUMMARY

According to some aspects of the present disclosure, an arrangement for providing a seal for a valve is provided herein. The arrangement includes a seat having an anchor portion, a connection portion extending radially from the anchor portion, and first and second sealing features extending from opposing sides of the connection portion. First and second energizers are respectively included arranged on opposing sides of the connection portion and are respectively positioned between the anchor portion of the seat and the first and second sealing features, respectively. First and second retainers are respectively positioned between the first and second energizers and the anchor portion of the seat on opposing sides of the connection portion.

According to some aspects of the present disclosure, an arrangement for providing a seal for a valve is provided and includes a seat having an anchor portion, a connection portion extending radially from the anchor portion, and first and second sealing elements extending from opposing sides of the connection portion in a generally axially-aligned orientation. First and second energizers are respectively arranged on opposing sides of the connection portion. Each of the first and second energizers are also respectively positioned between the first and second sealing elements and the anchor portion of the seat and are supported in generally axial alignment relative to each other by the first and second sealing elements, respectively.

According to some aspects of the present disclosure, a valve is provided that includes a body defining a cavity. An obturator is arranged within the body to selectively inhibit flow through the body. A seat has an anchor portion, a radially extending connection portion, and a sealing element extending from the connection portion arranged within the cavity. An energizer is positioned between the sealing element and the anchor portion of the seat. A retainer is positioned between the energizer and the anchor portion of the seat, the retainer and the sealing element each contacting a surface of the cavity.

DESCRIPTION OF THE DRAWINGS

The accompanying drawings, which are incorporated in and form a part of this specification, illustrate embodiments of the invention and, together with the description, explain the principles of embodiments of the invention.

DETAILED DESCRIPTION

Figure 1:
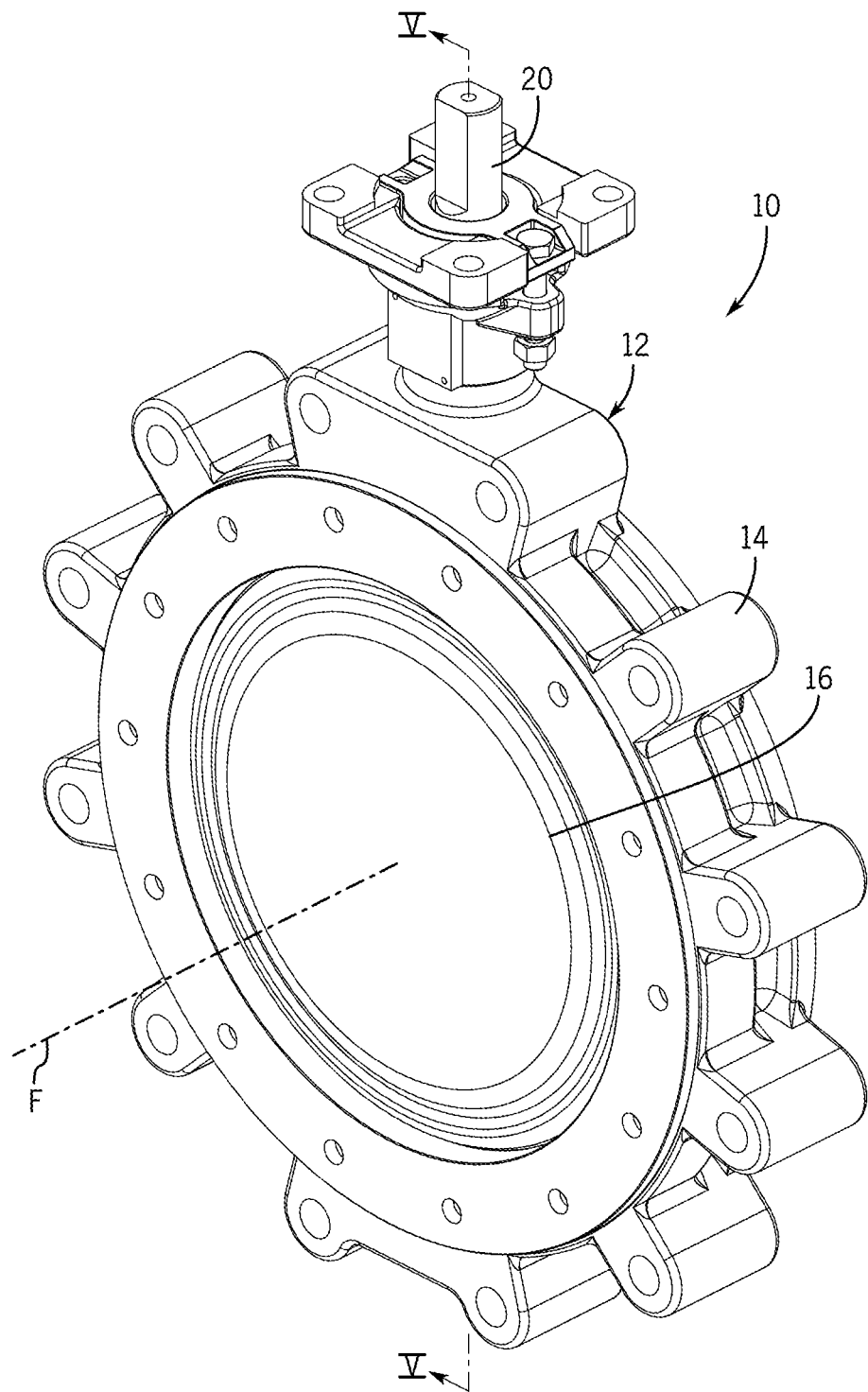
FIG. 1 is an isometric view of a valve, according to some examples.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments and examples shown but are to be accorded the widest scope consistent with the principles and features disclosed herein. The following detailed description is to be read with reference to the figures, in which like elements in different figures have like reference numerals. The figures, which are not necessarily to scale, depict selected embodiments or examples and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items. Likewise, unless otherwise specified or limited, the phrases "at least one of A, B, and C," "one or more of A, B, and C," and the like, are meant to indicate A, or B, or C, or any combination of A, B, and/or C, including combinations with single or multiple instances of A, B, and/or C.

As used herein, unless otherwise specified or limited, the terms "mounted," "connected," "supported," "secured", and "coupled" and variations thereof, as used with reference to physical connections, are used broadly and encompass both direct and indirect mountings, connections, supports, and couplings. Further, unless otherwise specified or limited, "connected", "attached", or "coupled" are not restricted to physical or mechanical connections, attachments or couplings.

For purposes of description herein, the terms "upper," "lower," "right," "left," "rear," "front," "vertical," "horizontal," and derivatives thereof shall generally relate to embodiments of the invention oriented as in FIG. 1. However, it is to be understood that some embodiments of the invention may assume various alternative orientations, except where expressly specified to the contrary. It is also to be understood that the specific devices and processes illustrated in the attached drawings and described in the following specification are simply examples of the inventive concepts defined in the appended claims. Hence, specific dimensions and other physical characteristics relating to the examples disclosed herein are not to be considered as limiting, unless the claims expressly state otherwise.

Similarly, for the purposes of description herein, the terms "radial" and "axial" are used relative to a flow axis through a relevant valve or other feature. In this regard, features that are generally arranged along a common reference line in the axial direction are described herein as being "axially aligned."

Certain operations of methods according to the invention, or of systems executing those methods, may be represented schematically in the FIGS. or otherwise described herein. Unless otherwise specified or limited, representation in the FIGS. or description herein of particular operations in particular order is not intended to require those operations to be executed in a particular order. Certain operations represented in the FIGS., or otherwise disclosed herein, can be executed in different orders, as appropriate for particular embodiments of the invention.

As noted above, valves can be used in a variety of industrial, commercial, and other applications to regulate, direct or otherwise control the flow of a media (gases, liquids, solids, or slurries), such as by opening, closing, or partially obstructing various passageways. In some applications, an obturator may be arranged in a plurality of positions for controlling the flow of the media and a seal assembly may engage or contact the obturator to further inhibit flow in some of the plurality of positions. For example, butterfly valves and ball valves can include various seal assemblies for this purpose.

However, conventional seal assemblies utilized in these valves can have high torque requirements to overcome the friction between the seal assembly and the obturator when moving the obturator between positions. Additionally, while the obturator is in an open position, portions of the seal assembly may be free of contact with the obturator. Any media moving through the valve, which may have a high flow rate, passes along the seal assembly that is separated from the obturator, and can result in wear or any other form of seal degradation or alteration.

Embodiments of a valve or a seal assembly provided herein can address these and other issues. For example, some examples of the valve or the seal assembly can provide an energized seat that can be capable of withstanding high flow rates with minimal wear while separated from the obturator (e.g., when the relevant valve is open). The energized seal assembly disclosed herein may also reduce an opening torque or other force for moving the obturator between the plurality of positions as compared to conventional arrangements. In this regard, the seal assembly may help to provide a valve that may be easier to operate and that may have reduced wear over time. Moreover, in some examples, portions of the seal assembly described herein may be formed from materials having temperature and/or corrosion resistance properties that can offer increased life expectancy or material suitability when compared to various elastomeric seals.

The valve or seal assembly provided herein can be implemented with regard to a variety of types and configurations of shut-off valves. For example, butterfly valves of different types or sizes, ball valves of different types or sizes, or other valves can implement the features provided herein. In different examples, the seal assembly may seal from a single direction or from two opposing directions depending on the relevant valve type, valve size, operating conditions (e.g., set pressure), or other factors.

Figure 2:
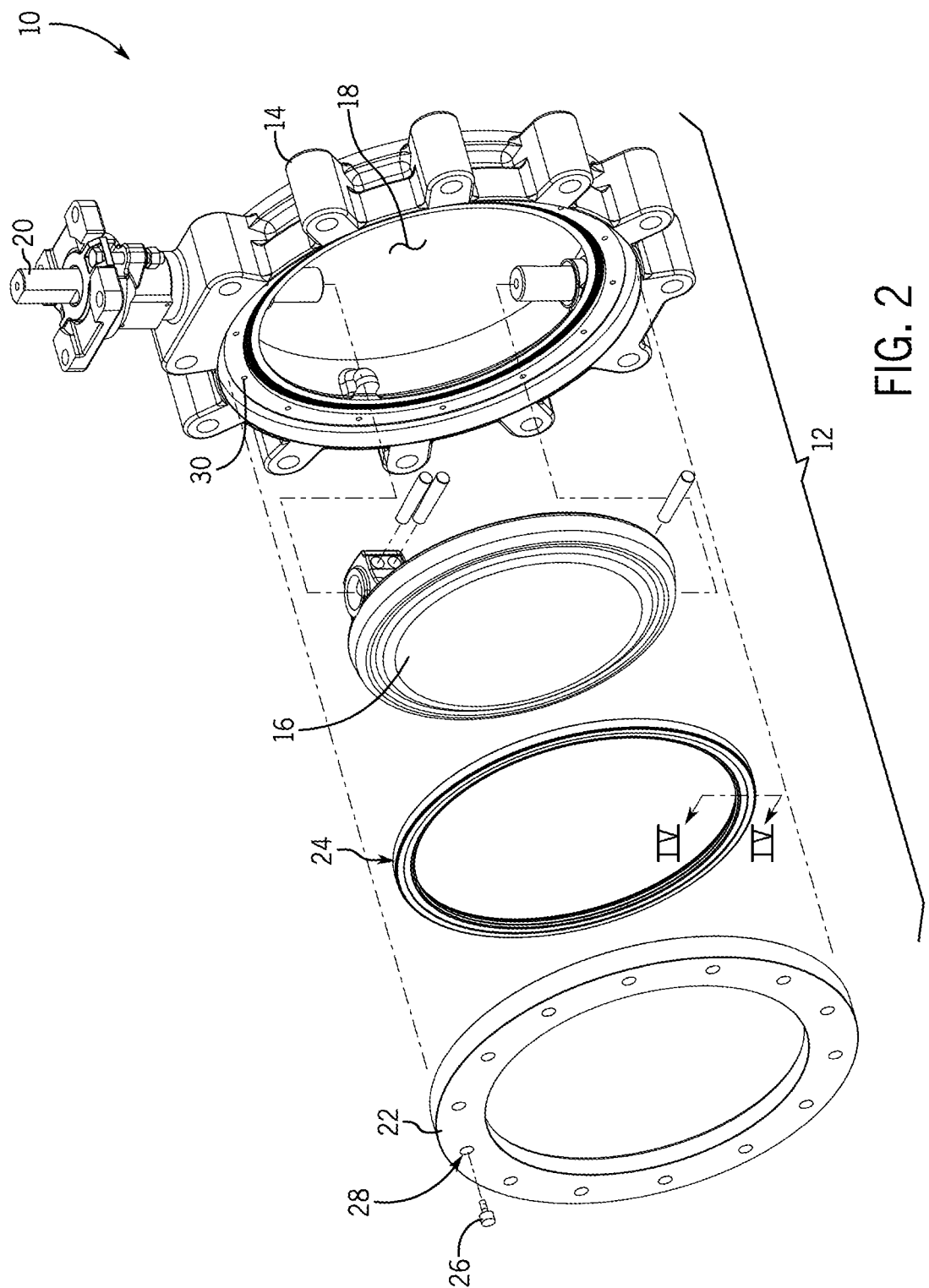
FIG. 2 is an exploded isometric view of the valve having a retaining ring, a seal assembly, a valve body, and a valve obturator, according to some examples.
Figure 8:
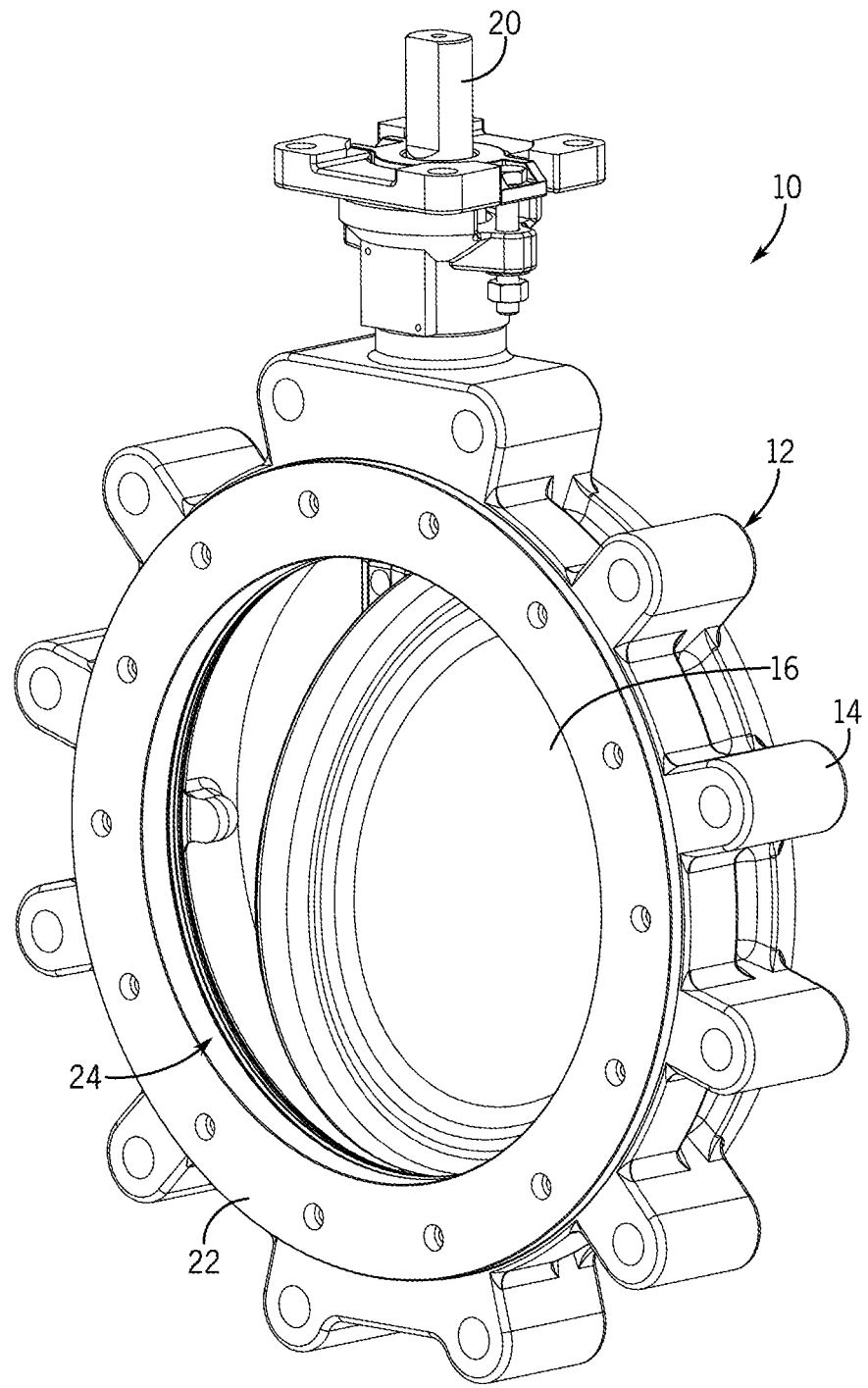
FIG. 8 is an isometric view of the valve with the obturator in a second position, according to some examples.

Referring now to FIGS. 1 and 2, a valve 10, such as a butterfly valve 12, includes a body 14 and an obturator 16, such as a disk. The obturator 16 may be movable between a plurality of positions including a first, closed position, an example of which is illustrated in FIG. 1, and a second, open position, an example of which is illustrated in FIG. 8. In the illustrated example, the first and second positions accordingly, can selectively inhibit and allow flow, respectively, along a flow axis F through a cavity 18 (FIG. 2) defined by the body 14. The valve 10 can further include a shaft 20 coupled to the obturator 16 to cause rotation of the obturator 16 between the first and second positions. The valve 10 can be used for controlling the flow of fluids, gases, or any other media. It will be appreciated that any valve 10 may include the features provided herein without departing from the scope of the present disclosure.

With further reference to FIG. 2, the illustrated example of the valve 10 includes a retaining ring 22, a seal assembly 24, the obturator 16 and the body 14. As also discussed below, multiple arrangements of the seal assembly 24 are potentially available for end user (or other) selection. In some examples, the seal assembly 24 may be selectively retained between the retaining ring 22 and the valve body 14. Additionally or alternatively, the seal assembly 24 may be coupled with or positioned about the obturator 16 and may move in conjunction with the obturator 16 between the first, closed position and the second, open position. In examples in which the seal assembly 24 is coupled and moved with the obturator 16, the seal assembly 24 can include any or all of the features discussed herein. It will be appreciated that the valve 10 may include any number of seal assemblies (i.e., one or more) without departing from the teachings provided herein. Likewise, as also discussed below, examples of a seal assembly as discussed herein can be installed for use with a variety of valve configurations.

In the illustrated example, fasteners 26 can couple the retaining ring 22 to the body 14. For example, the fasteners 26 may be screws, bolts, clips, clamps, any other suitable fastening mechanism, or combinations thereof. In some instances, the retaining ring 22 defines a plurality of through-holes 28 and the body 14 defines attachment voids 30 that are arranged to facilitate fastening the retaining ring 22 to the body 14. However, any of the components provided herein may be integrally formed with any other component without necessarily departing from the teachings provided herein. Further, any of the components provided herein may also be coupled to one another using adhesive or otherwise without necessarily departing from the scope of the present disclosure.

Figure 3:
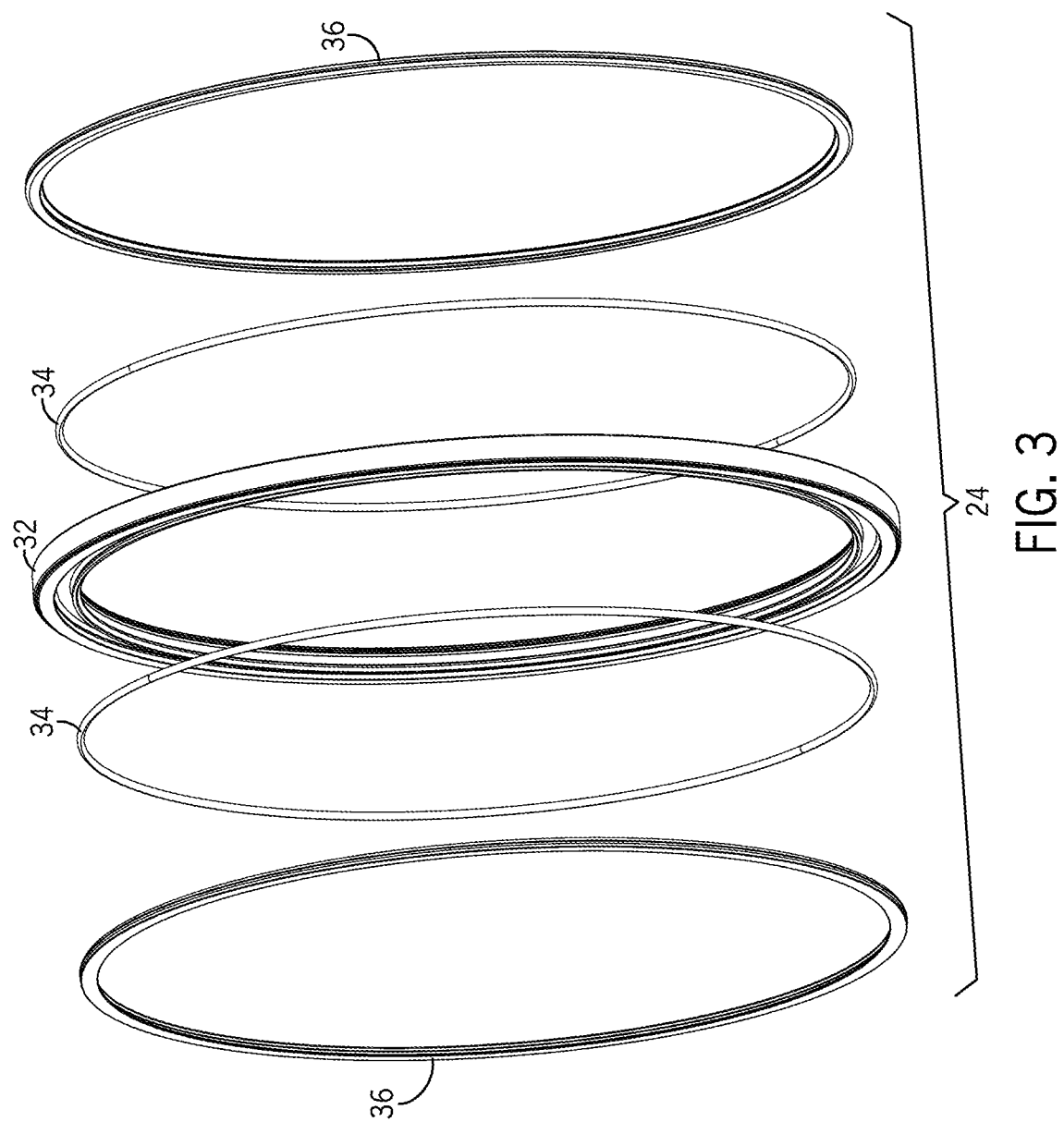
FIG. 3 is an exploded isometric view of the seal assembly, according to some examples.

In some examples, a seal assembly can include a seat with one or more energizers and one or more retainers that are configured to secure the energizers within the seat. This arrangement may be useful, for example, to provide a resiliently responsive seat for effective sealing. With reference to the example illustrated in FIGS. 3 and 4, for example, the seal assembly 24 includes a seat 32, a set of two energizers 34, and a set of two retainers 36. As also discussed below, this configuration can improve sealing by and resilience of the seal assembly 24, while also providing a number of benefits relative to manufacturing.

Figure 4:
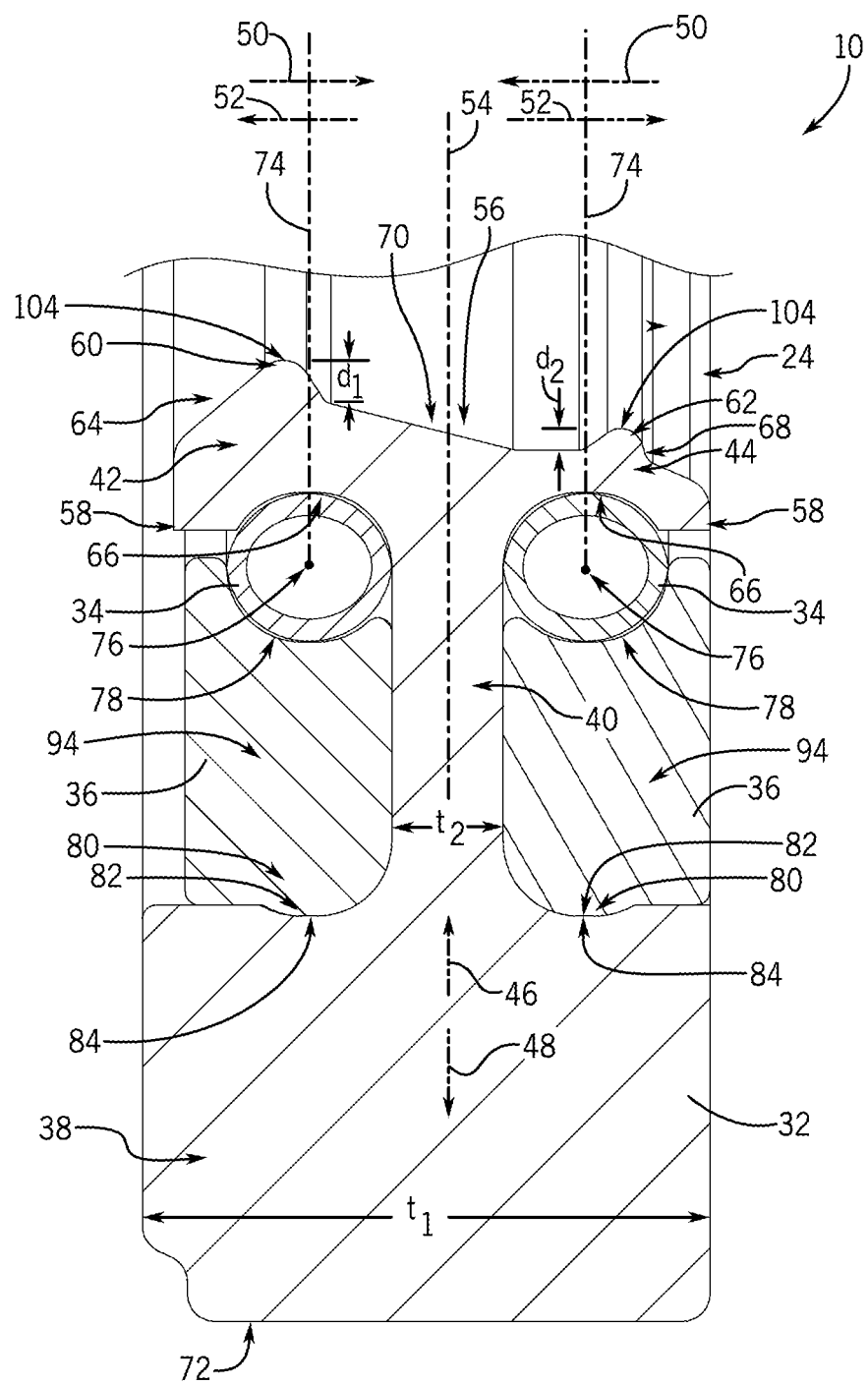
FIG. 4 is a cross-sectional view of the seal assembly of FIG. 2 taken along the plane IV-IV.

For the example illustrated in FIG. 4 and other similarly oriented examples, radially inward and outward directions are respectively represented by arrows 46 and 48 in FIG. 4. Similarly, axially inward and outward directions are respectively represented by arrows 50 and 52 in FIG. 4.

In some examples, including as illustrated in particular in FIG. 4, the seat 32 includes an anchor portion 38, a connection portion 40 that extends radially inwardly from the anchor portion 38, and one or more extended sealing elements 42, 44 that extend as sealing arms axially away from the connection portion 40. In some cases, including as illustrated in the example of FIG. 4, the first and second sealing elements 42, 44 may extend from the connection portion 40 in opposing directions to assist in bidirectional sealing. In some instances, the seat 32 may be modified to include a single sealing element (e.g., similar to the extended sealing element 42 as illustrated) that extends from a connection portion (e.g., similar to the connection portion 40) in any practicable manner.

In some examples, the seal assembly 24 can be self-relieving in an opposing direction to the extension direction of the sealing element 42. This function may be useful, for example, to provide relief in the event of over-pressurization, which may be caused by fluid trapped within the seat 32 or a pressure being raised to an unacceptable level, such as may be due to thermal expansion. In this regard, for example, the sealing elements 42, 44 (or other similar sealing elements) can be configured to flex away from the anchor portion 38 due to over-pressurization then resiliently return to the illustrated orientation.

In the example illustrated in FIG. 4, the connection portion 40 of the seat 32 extends radially inward from the anchor portion 38 along an extension axis 54. However, in some examples, a connection portion may extend in any linear or non-linear manner without necessarily departing from the scope of the present disclosure. The connection portion 40 of the seat 32 may be integrally formed with the seat 32, as illustrated in FIG. 4, or otherwise coupled thereto, such as at a radially outward end portion of the connection portion 40.

Likewise, in the illustrated example, the anchor portion 38 has a first axial thickness t1 and the connection portion 40 has a second axial thickness t2 that is less than the first axial thickness t1. However, in some cases, the first axial thickness t1 may be equal to or less than the second axial thickness t2.

As also noted above, in the example illustrated in FIG. 4, the sealing elements 42, 44 extend in first and second opposing axial directions from a radially inward end portion 56 of the connection portion 40. Further, to accommodate and retain the respective energizers 34, each respective sealing element 42, 44 terminates with a lip 58. Accordingly, a trench 66 can be defined, bounded by a radially outward surface of the first sealing element 42, the lip 58 of the first sealing element 42, and the connection portion 40 of the seat 32. Similarly, a trench 66 can be defined, bounded by a radially outward surface of the second sealing element 44, the lip 58 of the second sealing element 44, and the connection portion 40 of the seat 32.

In the illustrated example, the lips 58 extend radially outwardly towards the anchor portion 38 of the seat 32. However, it will be appreciated that the lips 58 may extend in other direction without necessarily departing from the teachings provided herein. Correspondingly, in some examples, a trench may not necessarily be defined by an inner surface or other structure of a lip.

In some examples, a radially outward profile of a seal assembly can be configured to provide an appropriately reliable and resilient sealing engagement with a sealing element. With further reference to FIG. 4, for example, the first sealing element 42 defines a first protrusion 60 extending radially inward a first distance $d_1$ and the second sealing element 44 defines a second protrusion 62 extending radially inward a second, smaller distance $d_2$. In other examples, the first and second protrusion 60, 62 may vary in size in any manner or be of equal size without necessarily departing from the scope of the present disclosure.

Also as illustrated in the example in FIG. 4, the first sealing element 42 defines a first chamfered surface 64 that extends between the first protrusion 60 and the lip 58 of the first sealing element 42. Likewise, the second sealing element 44 defines a surface 68 extending from the second protrusion 62 to the lip 58. A radially inward surface 70 of the seat 32 extends between and radially outward of the first and second protrusions 60, 62.

In some cases, the example configuration illustrated in FIG. 4 can provide for relatively low-torque actuation of relevant valves. For example, because one or more of the protrusions 60, 62 may contact the obturator 16 (see FIG. 1), rather than the entire radially inward surface of the seat 32, or possibly a central portion thereof, the amount of torque required to rotate the obturator 16 between different positions may be reduced when compared to some conventional seal assemblies. As also discussed below, the location of a reduced-thickness bend section 96 (see FIG. 6) axially inwardly of the protrusions 60, 62, and between the protrusions 60, 62 and the connection portion 40, can also assist in this regard.

In some examples, the seat 32 or various portions thereof, may be formed from a metallic material, a polymeric material, an elastomeric material, or combinations thereof. For instance, the seat 32, including the first and second sealing elements 42, 44 can be formed from a material at least partially containing polytetrafluoroethylene (PTFE) or another polymeric material such as a thermosetting plastic or a thermoplastic. For instance, the polymeric material may include high weight polyethylenes, polyurethanes, polyether ether ketones, or any other practicable materials. As another example, the seat 32, including the first and second sealing elements 42, 44 may have a hardness between 40 to 80 Rockwell, a hardness between 50 to 70 Rockwell, or a hardness between 50 to 60 Rockwell. This configuration, for example, can allow the seat 32 to be appropriately durable while also remaining flexible enough to engage and disengage the obturator 16 during operation of the valve 10.

In some instances, a seat according to the invention can be formed from a material that may be of a particular hardness that makes injection molding processes impracticable or unusable. In such instances, a preprocessed form of the seat may be provided and additional machining of the seat may be conducted through subtractive manufacturing. For example, milling or other machining can be used to form a cavity in the seat within which an energizer and retainer can be retained.

Figure 6:
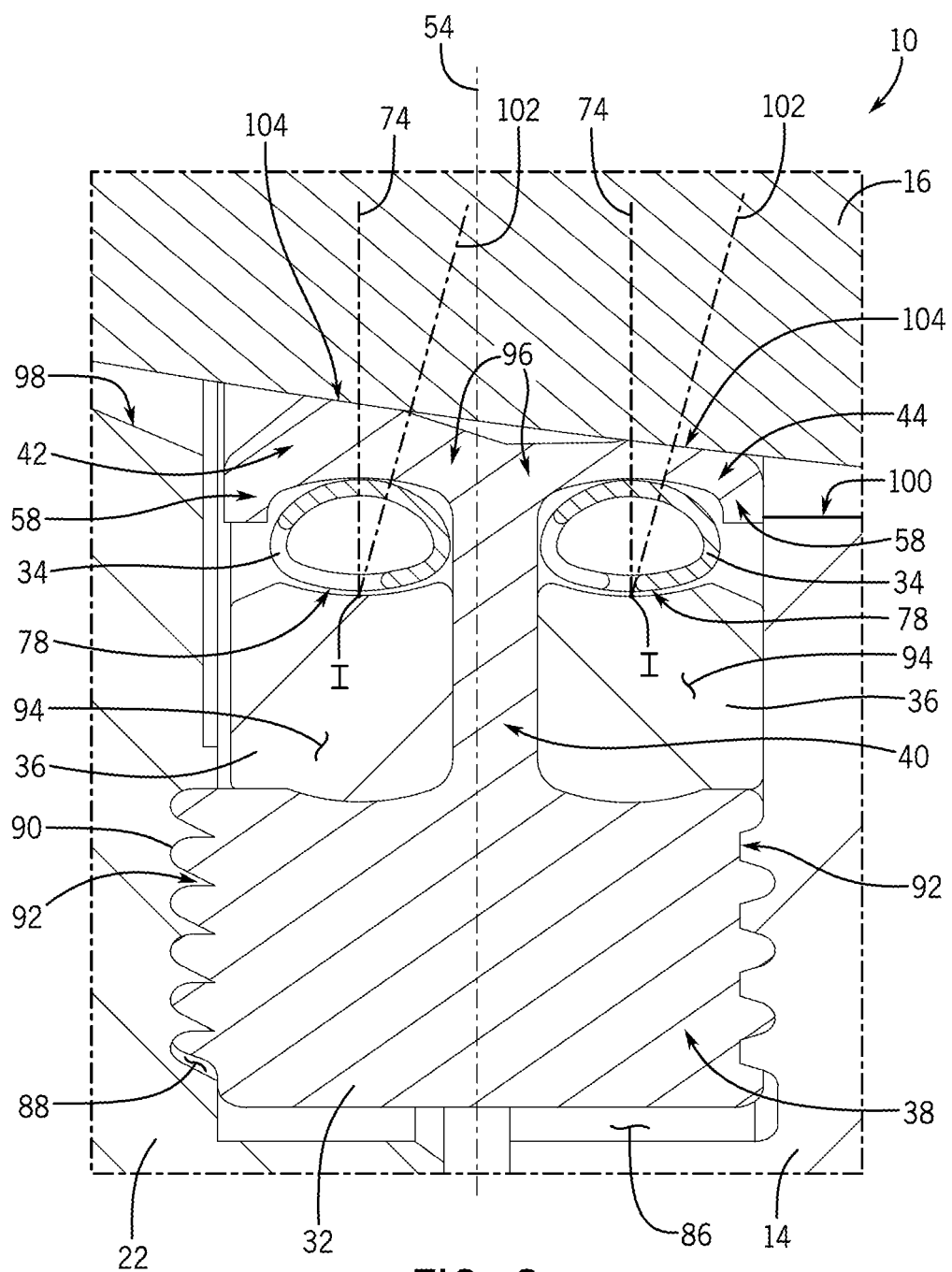
FIG. 6 is a detail view of region VI-VI shown on FIG. 5.

Relative to the seat 32, for example, milling or other machining can be used to form one or more seat cavities 94 that are open along one respective axial side and that are further defined, respectively, by the first and second sealing elements 42, 44, the connection portion 40, and the anchor portion 38. The first and second energizers 34 and the first and second retainers 36 can then be received and retained within the seat cavities 94. In some examples, such as illustrated in FIG. 6, when the seat 32 is installed for operation, the seat cavities 94 can be further bounded, respectively, by a surface of the body 14 and a surface of the retaining ring 22.

In some examples, use of retainers (e.g., the retainers 36) can be particularly useful for seats that are formed from subtractive manufacturing. For example, the size and operational-space requirements of known machine tools may require a cavity (e.g., the seat cavities 94) to be formed somewhat larger than may be appropriate for retention of an energizer alone. Accordingly, using conventional designs, forces on the seat during operation of the relevant valve may tend to displace energizers out of their appropriate dispositions within the seat. In this regard, for example, a retainer can fill the space of a seat cavity that may be required to allow subtractive manufacturing in order to help to prevent an associated energizer from being urged out of the seat cavity.

Referring back to FIG. 4, in the illustrated example, the first and second energizers 34 are respectively seated within the trenches 66, within the seat cavities 94. In particular, the energizers 34 are seated on opposing sides of the connection portion 40, between the first and second sealing elements 42, 44, respectively, and the anchor portion 38 of the seat 32.

In different examples with multiple energizers, the energizers can be oriented in different ways relative to each other, including in axial alignment (e.g., as in FIG. 4) or otherwise. For example, in the example illustrated in FIG. 4, the radially outer ends of the first and second energizers 34 are arranged at a substantially common radial distance from a radially outward surface 72 of the anchor portion 38, such that the energizers 34 are axially aligned along a plane that is normal to the extension axis 54 of the connection portion 40. In this regard, in the illustrated example, the first and second sealing elements 42, 44, at least along the respective trenches 66, are also positioned in a generally axially-aligned orientation. In other examples, other configurations are possible. Further, as also noted above, some examples may include only a single sealing element (e.g., similar to the extended sealing element 42). Accordingly, in some examples, only a single energizer may be used.

In some examples, energizers such as the first and second energizers 34 may be configured as a spring, a wire, an O-ring, or any other device capable of elastic deformation or other storage of potential energy. In examples utilizing a spring, the spring may be configured as a compressive, coil spring. However, one or both of the energizers 34 (or others) may additionally or alternatively be configured as a thin-wall hooped spring, a machined spring, a canted-coil spring, a garter spring, a coiled piece of tubing tuned with appropriate materials, cross-sectional diameter, and wall thickness, or any other type of spring without departing from the teachings provided herein. In this regard, for example, each of the energizers 34, as illustrated in FIG. 4, can be compressed—and can resiliently respond—along a respective energizer compression axis 74 (or otherwise). In some examples, the energizer compression axis 74 may be normal to a wrapping axis 76 of the coil.

In some examples, as also noted above, retainers can be configured to help retain energizers within a particular seat, including when the seat has been compressed by the relevant obturator. For example, with further reference to FIGS. 3 and 4, the first and second retainers 36 are respectively positioned between the first and second energizers 34 and the anchor portion 38 of the seat 32 on opposing sides of the connection portion 40. Thus arranged, the retainers 36 can accordingly assist in retaining the energizers 34 in a predefined location within the seat cavities 94 (see FIG. 4). In some instances, the predefined location may correspond to each of the energizers 34 being seated within the respective trench 66 (see FIG. 4), such that the energizers 34 are partially surrounded by the first and second sealing elements 42, 44 and the lips 58 cooperate with the retainers 36 to help appropriately retain the energizers 34.

In some examples, a retainer can span a distance between an energizer and an opposing portion of a seat (e.g., an anchor portion) to mechanically impede movement of the energizer out of a desired orientation. As illustrated in the example of FIG. 4, for example, a first end portion 78 of each of the retainers 36 is proximate to and in contact with a respective one of the energizers 34. Further, a second end portion 80 of each of the retainers 36 is proximate to and in contact with a respective radially inward surface of the anchor portion 38, within the respective seat cavity 94.

In some examples, a retainer can radially overlap with one or more sides of an energizer to further assist in retaining the energizer in an appropriate orientation. For example, as illustrated for the example of FIG. 4, each of the first and second retainers 36 extends radially inwardly to radially overlap with the first and second energizers 34, respectively, on two axially opposed sides of each of the first and second energizer 34. As a result, for example, retainers 36 can not only generally resist radial movement of the energizers 34 but can also mechanically block axial movement of the energizers 34, such as may be induced by certain operations of the valve 10 (see, e.g., FIG. 5). In some instances, energizers may be arranged more fully within the retainers, or can be integrally formed therewith. In some instances, a retainer may radially overlap with an energizer on only one axial side of the energizer.

In some examples, a retainer can include a retainment feature that engages a corresponding feature on a valve seat. Referring still to FIG. 4, for example, the retainers 36 include retainment features 82 respectively defined along end portions 80 of the first and second retainers 36. In particular, in the illustrated example, the retainment features 82 are configured to protrude from the main bodies of the retainers 36 to interact with corresponding first and second recessed retainment structures 84 defined by the seat 32. Also in the illustrated example, the retainment structure 84 of the seat 32 is integrally formed with the radially inward surface of the anchor portion 38. However, in some examples other portions of the seat 32 may include a retainment structure. Moreover, in some examples, a retainment structure can be integrally formed with the seat 32 or later attached thereto without necessarily departing from the scope of the present disclosure. For example, a retainer can be formed to be flexibly attached to a seat (e.g., integrally formed at an anchor portion thereof) in order to be pivoted out of and into a cavity of the seat to admit and retain, respectively, a corresponding energizer.

In some instances, during assembly, the energizer 34 may be arranged within the seat 32 and the retainer 36 may then "snap" into place through interaction of the retainment features 82 and the retainment structure 84, which may ensure proper orientation of the assembly. Accordingly, in some examples, a radially outward surface of the first or second retainer 36 can define a convex surface and a radially inward surface of the first or second retainer 36 can define a concave surface. In other examples, other corresponding (e.g., complementary) geometries are possible. Similarly, in some embodiments, energizers, retainers, or other features can be appropriately secured using other techniques, such as threading, welding, gluing, swaging, and so on.

In some examples, a retainer can be formed of a harder material than a seat, as may help a retainer to securely retain a relevant energizer within the seat. For example, relative to the example illustrated in FIG. 5, either or both of the sealing elements 42, 44 can be formed of a first material and either or both of the retainers 36 can be formed of second, harder material as measured by a Rockwell hardness test method or through any other hardness test method known in the art. For example, the seat 32 or the sealing elements 42, 44 may be formed from polytetrafluoroethylene (PTFE) or a similar material while the retainer 36 is formed from a material containing reinforced tetrafluoroethylene (RTFE) or other suitably strong and abrasion resistant materials, which may accommodate high pressure and high temperature applications. In some examples, this arrangement can also contribute to appropriate resiliency in the response of an energizer to the forces imposed by the obturator (e.g., as the valve is closed). In some examples, a retainer can be formed from other materials, including metal, glass, ceramic, carbon fiber, rubber, and so on.

Figure 5:
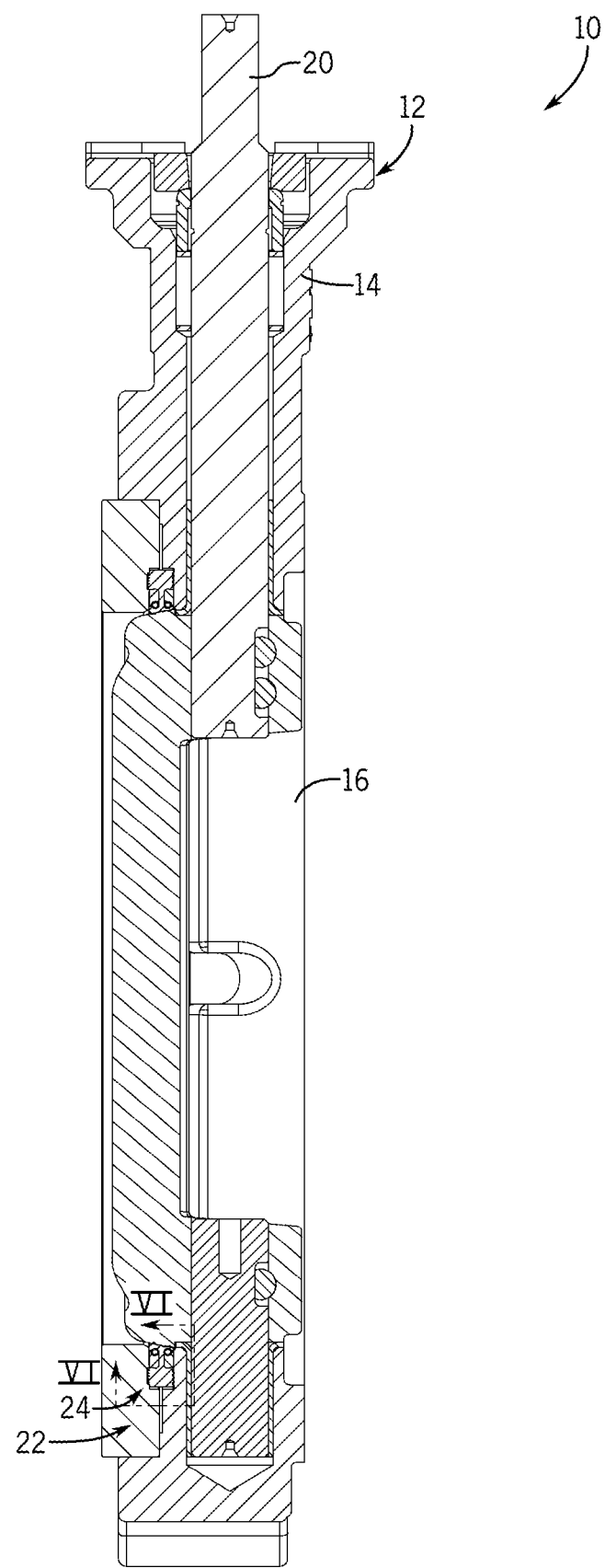
FIG. 5 is a cross-sectional view of the valve of FIG. 1 taken along the plane V-V.

In some examples, a seat can be retained within a void formed by a body or other structure of a valve. Referring to FIGS. 5 and 6, for example, the anchor portion 38 of the seat 32 can be arranged within a void 86 (see FIG. 6) defined by the body 14 and the retaining ring 22 upon assembly of the valve 10. In some instances, the void 86 can be formed by the coupling of the body 14 to the retaining ring 22. In other instances, a similar void can be formed in other ways.

Other structures can also be provided to help secure a seat in place. For example, in the illustrated embodiment, the body 14 and the retaining ring 22 further define a channel 88, and an axially outward surface 90 of the anchor portion 38 can be positioned with the channel 88. In some examples, the positioning of the anchor portion 38 within the channel 88 can help to retain the seat 32 within the void 86. In some implementations, the body 14 or the retaining ring 22 can include one or more ridges 92 that contact the anchor portion 38 of the seat 32 and thereby help to dispose and retain the anchor portion 38 of the seat 32 in a predefined position. In this regard, for example, the channel 88 is also divided into a plurality of sub-channels, separated by the various ridges 92, into which corresponding protrusions on the anchor portion 38 can extend.

In some examples, a lip of a seal can be configured to overlap with part of a body of a valve or part of a retaining ring. As shown in FIG. 6, for example, the free ends of the lips 58 of the first and second sealing elements 42, 44 extend axially outward of the first and second protrusions 60, 62. Further, the free ends of the lips 58 also extend radially outwardly, to radially overlap with the body 14 and the retaining ring 22 at a radially inward edge of the void 86 and thereby fully close the seat cavities 94. In some examples, features on a seat may not similarly engage a body or a retaining ring, such that a corresponding seat cavity 94 may remain partially open. For example, in some embodiments, lips on a sealing element may not necessarily extend to overlap with radially inward edges of a void defined by a valve body or a retaining ring.

As noted above, in some examples, including in configurations in which the relevant seat cavities are fully closed upon installation lips of a seat (e.g., the lips 58) can be configured to be sufficiently resiliently flexible to relieve overpressure. Still referring to FIG. 6, for example, in some instances, the pressure within the seat cavity 94 may vary from a pressure within the body cavity 18. With appropriate configuration of one or both of the lips 58, the variation in pressure may cause the lip 58 of the first or second sealing element 42, 44 to bend (e.g., rotate) radially inwardly at the relevant bend section 96, thereby assisting in balancing of the pressure between the relevant seat cavity 94 and the body cavity 18 (see, e.g., FIG. 2). In such instances, the lip 58 of the sealing element 42, 44 may then substantially and resiliently return to its original position (e.g., radially outward of a radially inward surface 98 of the retaining ring 22 or a circumferential surface 100 of the body 14).

In this regard, for example, the thickness of the bend sections 96 relative to other portions of the seat 32 can be carefully selected, including to exhibit a thinner aspect than, for example, a crown portion 104 of the protrusions 60, 62. An appropriate balancing of thicknesses can also be beneficial, for example, to obtain appropriate response to the obturator 16. For example, with appropriately thinned bend sections 96, the sealing elements 42, 44 can be configured to appropriately flex in response to contact with the obturator 16 as the obturator 16 is rotated closed.

In some examples, an energizer compression axis can be angularly or otherwise offset from an engagement compression axis defined by the force-direction of engagement between an obturator (e.g., butterfly disc or ball of a ball valve) and a seat. With further reference to FIG. 6, for example, the energizer compression axis 74 is substantially parallel to the extension axis 54 of the connection portion 40 of the seat 32. Further, the energizer compression axes 74 are axially and angularly offset from a sealing-element engagement axis 102 that is defined by contact between the obturator 16 and a crown portion 104 of each of the first and second protrusions 60, 62 (see FIG. 4) and is directed from the crown portions 104 toward a predefined location (e.g., a central portion) of the obturator 16. As used herein, the crown portion 104 of the first or second protrusions 60, 62 may be defined as the portion of each respective protrusion 60, 62 that extends the furthest radially inward. In some instances, the crown portion 104 may be compressed when the obturator 16 is in contact with one or more of the sealing elements 42, 44 from a first position, which according to some examples, is illustrated in FIG. 4, to a second position, which according to some examples, is illustrated in FIG. 6. In some examples, the engagement axis 102 may be normal to a surface of the obturator 16 (e.g., extend radially from a center-point of the obturator 16).

In different examples, compression axes of an energizer and as defined by engagement of an obturator with a seat can intersect at particular locations. For example in some examples, these axes can intersect at locations within an obturator or within a valve seat. In some examples with multiple energizers and corresponding seat protrusions, axes for one energizer and the corresponding seat protrusion can intersect in different relative locations than axes for another energizer and the corresponding seat portion (e.g., within the obturator vs. within the seat).

In the example illustrated in FIGS. 4 and 6, the crown portions 104 of the first and second protrusions 60, 62 (see FIG. 4) are positioned axially outward of the energizer compression axes 74 and are substantially compressible by the obturator 16. Thus, for example, each of the energizer compression axes 74 may initially intersect the corresponding sealing-element engagement axis 102 at a respective position (not shown) that is radially inward of or radially aligned with the first and second protrusions 60, 62. However, as the crown portions 104 are further compressed, one or both of the engagement axes 102 may shift relative to the seat 32. Accordingly, for example, with the seat 32 fully engaged by the obturator 16, each of the engagement axes 102 may intersect the respective compression axes 74 inside of the seat 32 and radially outside of the energizers 34 (e.g. at intersection point I in FIG. 6).

The relative alignment of compression axes and engagement axes, such as discussed above, can have a variety of benefits. For example, when the seat 32 is compressed along the compression axes 74, the resulting forces on the energizers 34 may, in addition to compressing the energizers 34 along the axes 74, tend to urge the energizers 34 towards, rather than away from, the connection portion 40. Accordingly, in comparison to conventional arrangements, compression of the seat 32 may result in less tendency to urge the energizers 34 out of position or even out of the cavities 94. As also noted above, this retention aspect of the configuration can be further enhanced by the location and configuration of the retainers 36.

Figure 7:
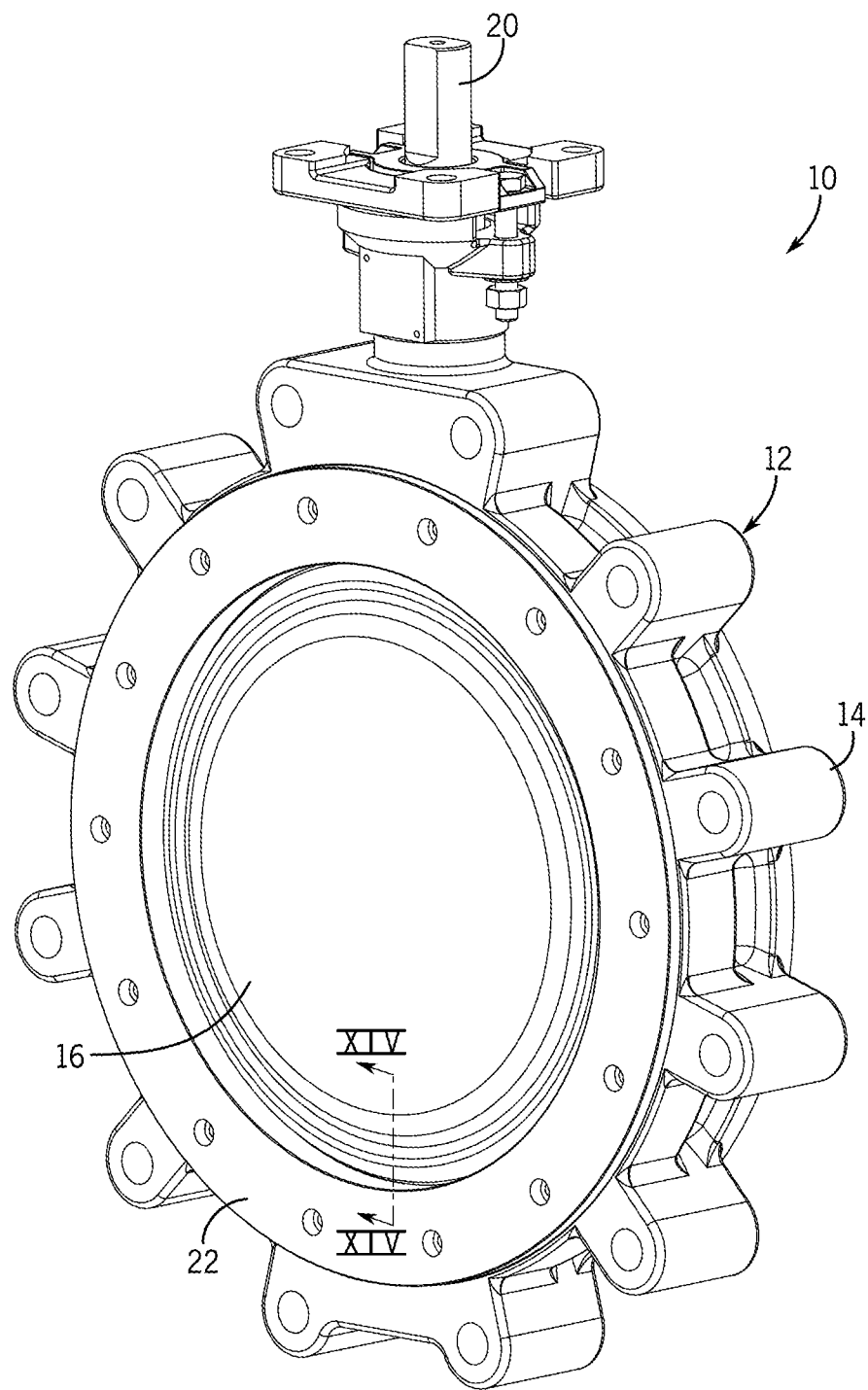
FIG. 7 is an isometric view of the valve with the obturator in a first position, according to some examples.

Referring to FIGS. 6-8, when the obturator 16 is moved between a first, closed position, as illustrated in FIGS. 6 and 7 and a second, open position, as illustrated in FIG. 8, each sealing element 42, 44 can also bend (e.g., rotate) at the respective sealing-element bend sections 96 arranged between the connection portion 40 and the lip 58 of each respective sealing element 42, 44. This can, for example, allow the obturator 16 to be admitted into or released from sealing contact with the seat 32 without requiring excessive torque. Further, the energizers 34, in conjunction with the retainers 36 and the seat 32 generally, can provide support to the sealing elements 42, 44 in this regard, to ensure appropriate sealing of the valve. Notably, and in contrast to seals for rotating shafts, during movement of the obturator 16 between the noted first and second positions, at least parts (e.g., substantially all) of the sealing elements 42, 44 come into and out of contact with the obturator 16.

In some cases, after multiple cycles of moving the obturator 16 between the first and second positions, the seat 32 or portions thereof, such as the sealing elements 42, 44, may wear sufficiently that replacement may be appropriate. In some cases, the removable aspect of the energizers 34 or the retainers 36, each of which can be separable from the seat 32 in the illustrated example, may allow these components to be reused with a replacement seat 32.

Figure 9:
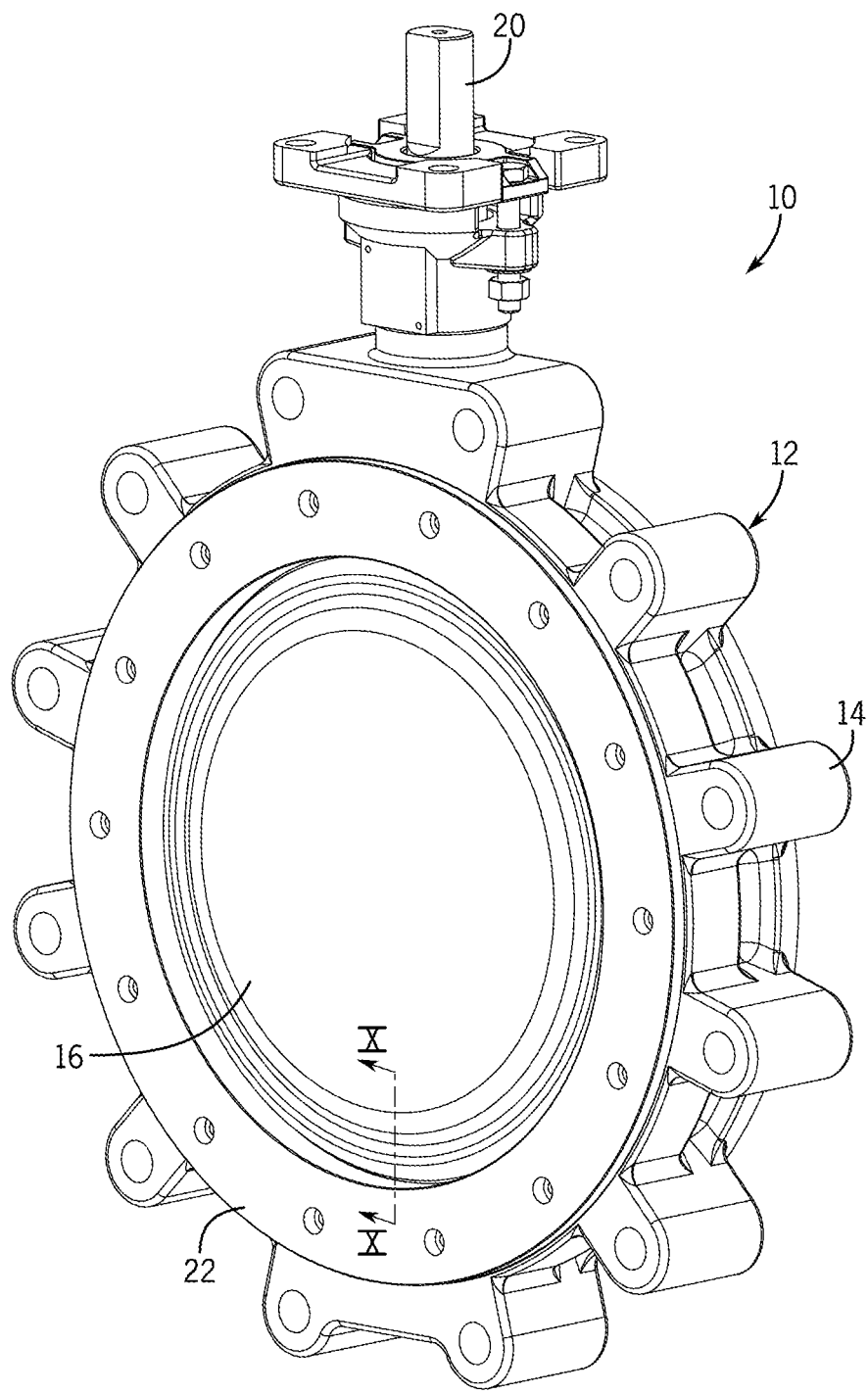
FIG. 9 is an isometric view of the valve, according to some examples.
Figure 10:
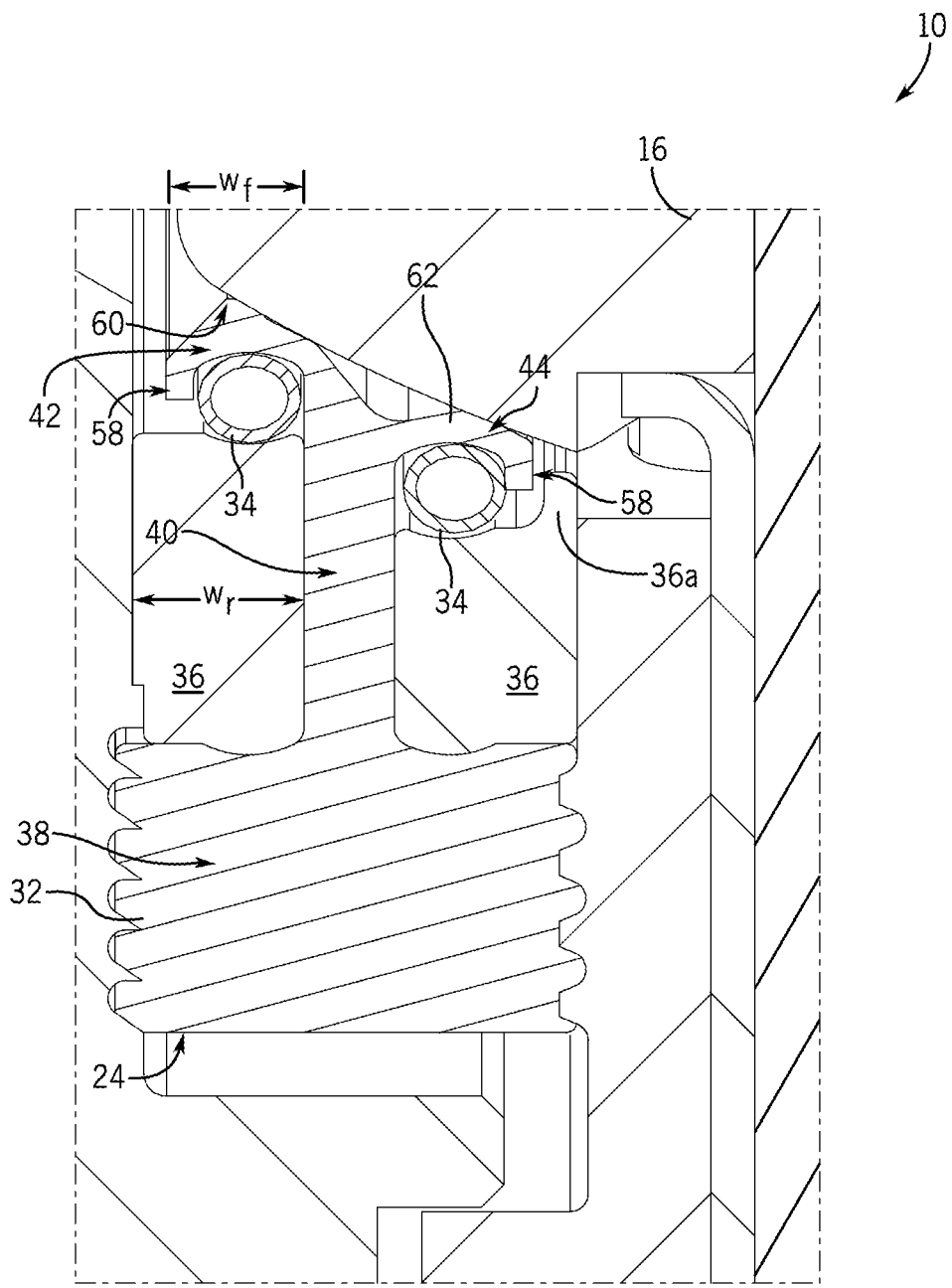
FIG. 10 is a cross-sectional view taken along the line X-X of FIG. 9 illustrating the seal assembly engaged with the obturator, according to some examples.

Referring to FIGS. 9 and 10, in some examples, a first sealing element of a valve seat may be radially offset from a second sealing element of a valve seat. For example, as illustrated in FIG. 10 in particular, the radially outermost portion of the first sealing element 42 of the illustrated embodiment can be arranged radially farther from the anchor portion 38 than is the radially outermost portion of the second sealing element 44. Similarly, a seated position for the energizer 34 within a trench of the first sealing element 42 can be arranged radially farther from the anchor portion 38 than is a seat for the energizer 34 within a trench of the second sealing element 44. Indeed, in the embodiment illustrated, the seat for the energizer 34 within the first sealing element 42 is also arranged radially farther from the anchor portion 38 than is the radially outermost portion of the second sealing element 44. These and other offset orientations may helpfully account for certain curvatures or other geometry of a particular configuration of the obturator 16 or the various possible movement patterns of the obturator 16.

In the example illustrated in FIGS. 9 and 10, the first sealing element 42, which is arranged upstream of the second sealing element 44, is radially outward of the second sealing element 44. However, it will be appreciated that the second sealing element 44 may be radially outward of the first sealing element 42 in some implementations without necessarily departing from the scope of the present disclosure.

In some implementations, the first or second retainers 36 can be arranged axially outward of the lips 58 of the respective first and/or second sealing elements 42, 44 such that a width $w_f$ of the first or second sealing element 42, 44 may be less than a width $w_r$ of the retainer 36. It will be appreciated, however, that in other examples, the width $w_f$ of the first or second sealing element 42, 44 may be greater than or substantially equal to the width $w_r$ of the retainer 36 without departing from the scope of the present disclosure.

In some examples, as illustrated in FIG. 10, the anchor portion 38 of the seat 32 can extend axially outward of at least one of the first and second retainers 36 or at least one of the first and second sealing elements 42, 44. Similarly, in some examples, at least part of the first or the second retainers 36 can be arranged axially outward of the first or second sealing elements 42, 44 or radially outward of a portion of the seat 32. In some examples, a retainer can include an extended lip, such as a lip 36a on the retainer 36 aligned with the sealing element 44 in FIG. 10. The lip 36a, for example, can extend axially outward of, and radially overlap with, the lip 58 of the sealing element 44, as may be useful to further retain the energizer 34 while still allowing for appropriate response to overpressure events.

Figure 11:
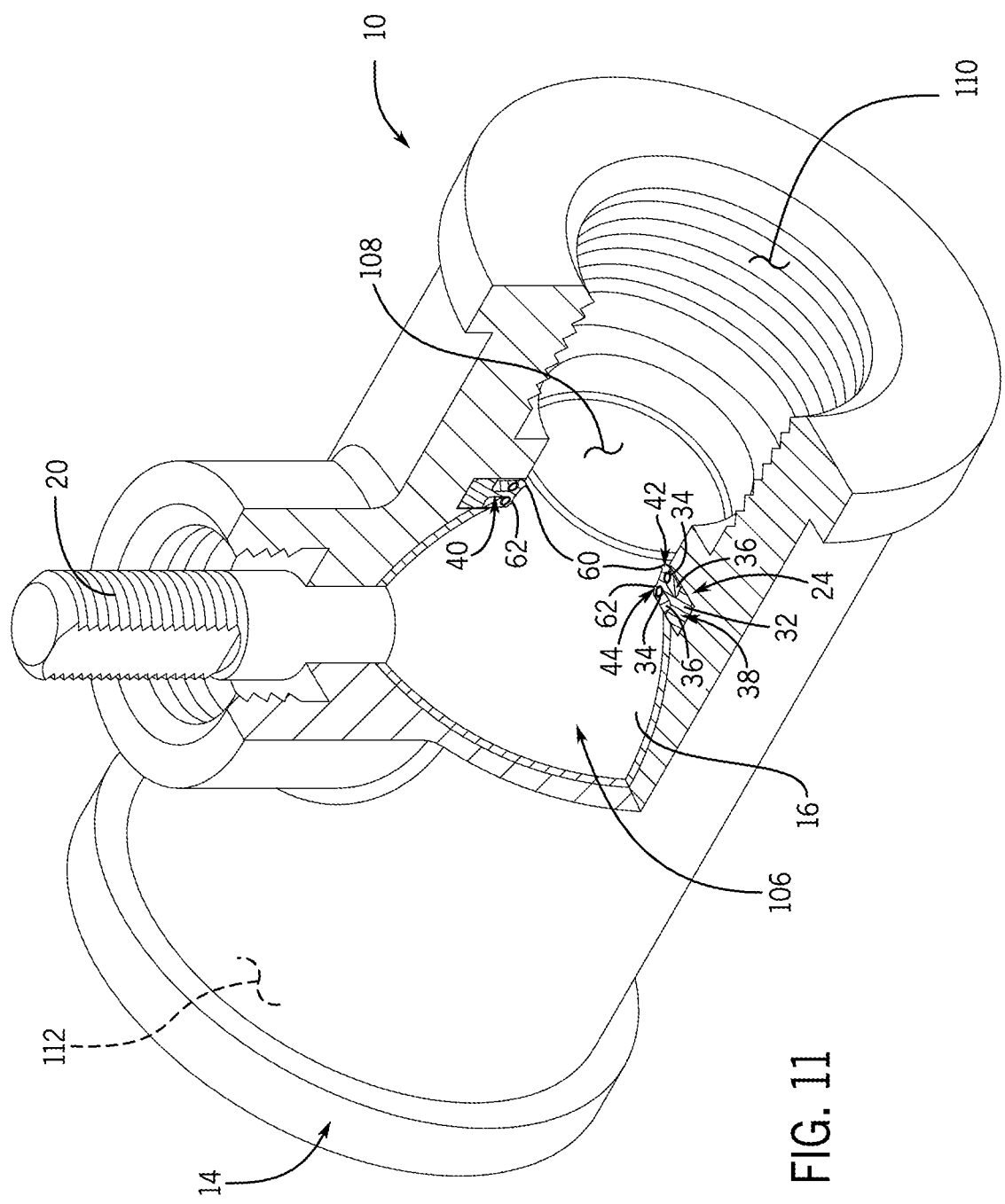
FIG. 11 is an isometric view of the valve, according to some examples.

Referring to FIG. 11, in some examples, the valve 10 may be configured as a ball valve 106. In the illustrated example, the obturator 16 is formed in a generally spherical shape that defines a conduit 108 arranged through a portion thereof. A control shaft 20 that extends outward from the obturator 16 can be configured to move the obturator 16 between a first, closed position and a second, open position. The body 14 of the valve 10 may be arranged around the obturator 16 and may define an inlet 110 and an outlet 112.

To assist in sealing the valve 10, an example configuration of the seal assembly 24 may be circumferentially arranged about the body 14 in a position between the inlet 110 and the outlet 112 and the obturator 16, or otherwise arranged within the valve 10. As provided herein, the seal assembly 24 can include an example of the seat 32 similar to that illustrated in FIG. 4, with examples of the sealing elements 42, 44, examples of the energizers 34 arranged radially outward of the sealing element 42, 44 and examples of the retainers 36 on an opposing side of the energizers 34 from the sealing elements 42, 44. In some instances, as similarly discussed above, as the obturator 16 is moved between the first and second positions, the seal assembly 24 may be in contact or otherwise engaged with the obturator 16 in some circumferential positions and separated from the obturator 16 in other circumferential portions. In some examples, as also noted above, other configurations are possible, including configurations with only a single sealing element, energizer, and retainer, or configurations with retainers, energizers, sealing elements, or other features that are configured somewhat differently than is illustrated in the example of FIG. 11 (or other FIGS.).

Figure 12:
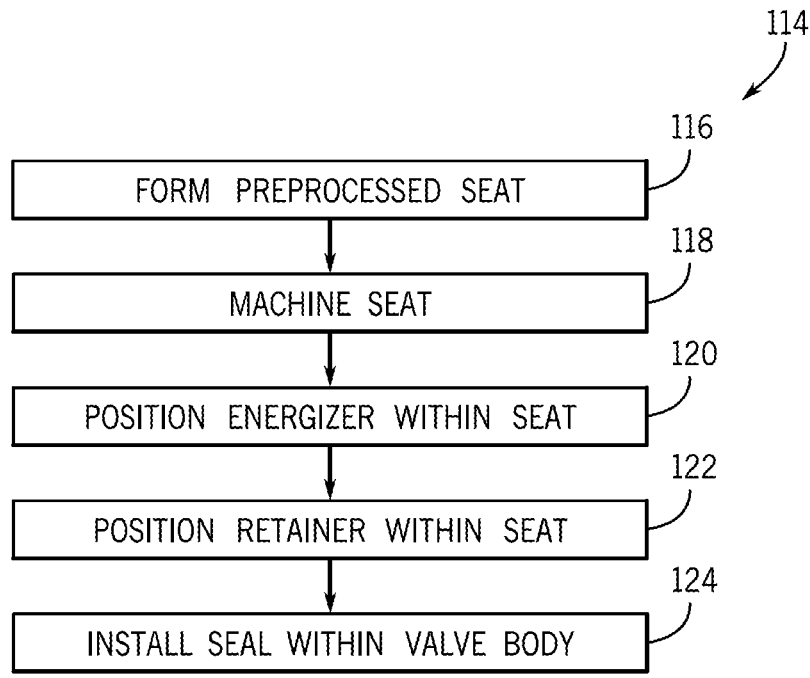
FIG. 12 is a flowchart of a method of manufacturing the seal assembly through machining, according to some examples.

As also noted above, some examples of the seal assembly disclosed herein can be formed using subtractive manufacturing. Referring to FIG. 12, a method 114 of manufacturing the seal assembly 24, according to some examples, includes forming the seat 32 through subtractive machining, which may be used for creating any shape using a cutting tool. In the example illustrated, the method begins at step 116, in which an initial manufacturing process may form a preprocessed seat 32 through any practicable process, including, but not limited to, extrusion and molding processes. Next, at step 118, the cutting tool removes material from one or more portions of the seat 32 to form a seat cavity 94 between the anchor portion 38 of the seat 32 and the sealing elements 42, 44. At step 120, an energizer 34 is positioned within the cavity. At step 122, a retainer 36 is positioned between the energizer 34 and the anchor portion 38 of the seat 32. As provided herein, for example, the retainer 36 may include a retainer feature (e.g., similar to the retainer feature 82) and the anchor portion 38 may include a retainment structure (e.g., similar to the retainment structure 84) which interact with one another to assist in ensuring proper orientation of the retainer 36 within the seat 32. Lastly, at step 124, the assembled seal assembly 24 is arranged within the valve body 14.

In contrast, in some examples, an additive manufacturing process can be used. For example, referring to FIG. 13, an additive manufacturing process 126 may be used to form one or more components of the seal assembly 24. For example, part or all of the seat 32 may be formed at step 128 by depositing successive layers of liquid, powder, sheet material or other, in a layer-upon-layer fashion. In this regard, additive manufacturing (e.g., at the step 128) can include any practicable manufacturing process, including but not limited to, 3-dimensional printing, rapid prototyping (RP), direct digital manufacturing (DDM), layered manufacturing, additive fabrication, and the like. In some instances, the additive manufacturing can be used to form a first portion of the seat 32, such as the sealing element 42, 44. Next, at step 130, the energizer 34 may be positioned on the sealing element 42, 44. At step 132, the retainer 36 may be positioned proximately to the energizer 34 and/or integrally formed with other portions of the seat 32. Lastly, at step 134, the remaining portions of the seat 32 may be formed.

Figure 13:
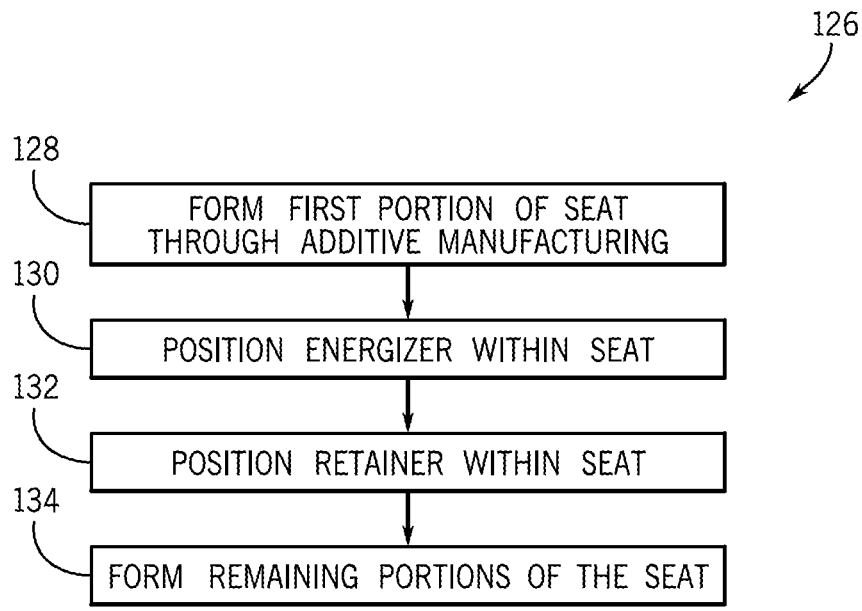
FIG. 13 is a flowchart of a method of manufacturing the seal assembly or portions thereof through additive manufacturing, according to some examples.

In some examples, steps of the methods 114 and the process 126 can be executed in different orders than presented above and illustrated in FIGS. 12 and 13, including with one or more steps executed simultaneously. For example, in some approaches, the step 122 of positioning a retainer within a seat can be implemented before, or simultaneously with, the step 120 of positioning an energizer within the seat. Similarly, in some approaches, a retainer and an energizer can be assembled together and then simultaneously positioned within a seat. As another example, during additive manufacturing, an energizer can be positioned within a seat simultaneously with or after a retainer is positioned within the seat, or portions of the seat can be formed between steps of positioning an energizer and positioning a retainer within the seat. Further, in some cases, the use of additive manufacturing may allow for only an energizer, but not a separate retainer (or vice versa), to be used. Likewise, in some cases, additive manufacturing may allow for an energizer to be integrally formed with a seat or retainer.

Figure 14:
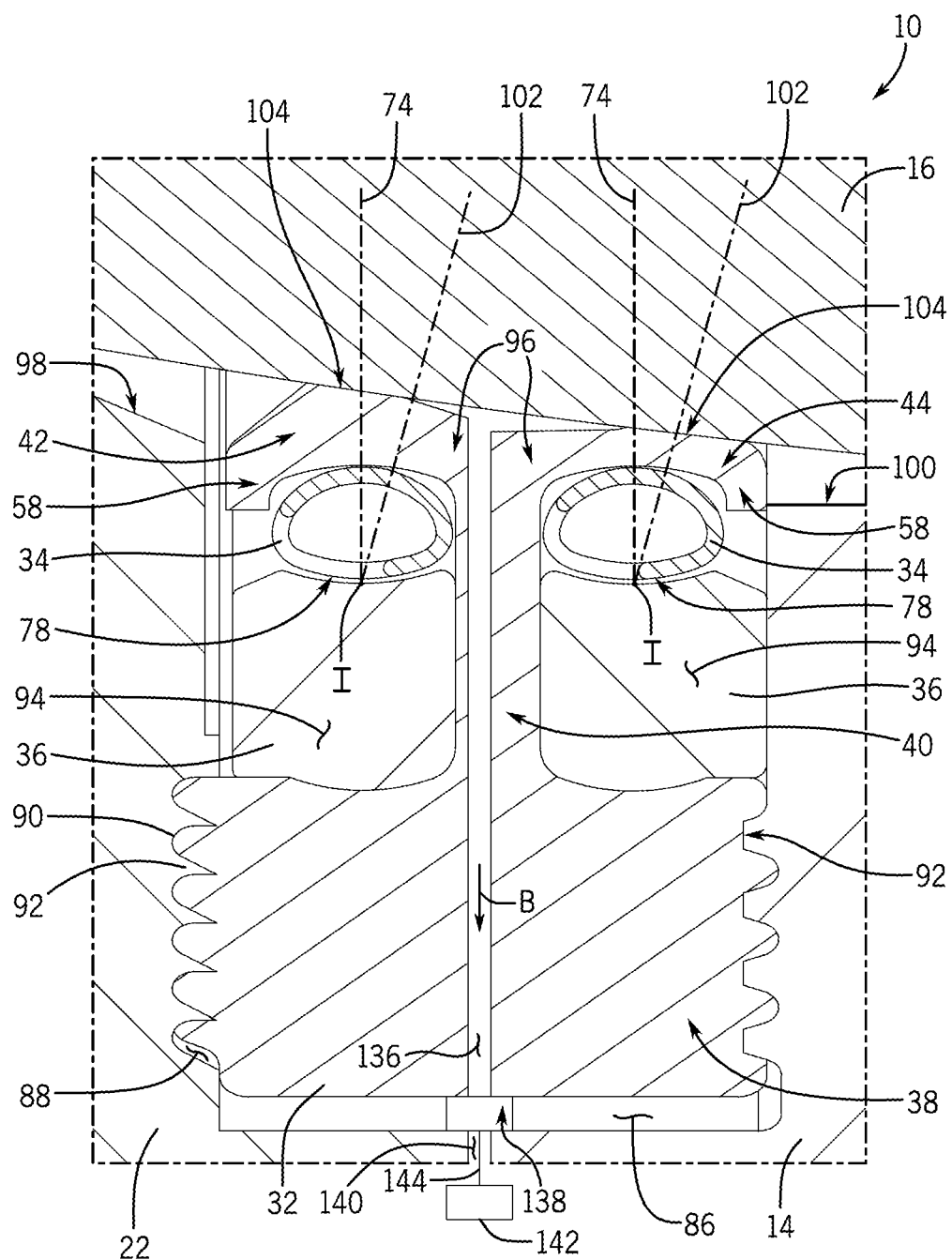
FIG. 14 is a cross-sectional view of an alternative configuration of the valve of FIG. 7 taken along the plane XIV-XIV.

In some examples, a seal of the present disclosure may be configured for leak detection and may accordingly include a leak detection unit capable of detecting a failure of one or more sealing elements of the seal. For example, as illustrated in the embodiment of FIG. 14, the seat 32 defines a port 136 that extends from a radially outward portion to a radially inward portion of the seat 32. In the embodiment illustrated, the port 136 extends through the anchor portion 38 and the connection portion 40, between the first and second sealing elements 42, 44. In other examples, the port 136 can extend in various other directions or through various other portions of the seat 32 to fluidly couple a space radially inward of a portion of the seat 32 to an area radially outward of the seat 32.

With further reference to FIG. 14, a leak detection unit, shown generally as 138, is operably coupled with the port 136 and can be at least partially disposed within the void 86 defined by the body 14 and the retaining ring 22. The leak detection unit 138 may be placed in a closed position with the result that material flowing in the direction of arrow B through the port 136 is substantially inhibited from escaping past the leak detection unit 138 and an open position with the result that any fluid in the port 136 can drain through the leak detection unit 138 via suitable drains.

In examples in which the port 136 is disposed through the seat 32, a leak may be detectable within the valve 10 when the obturator 16 is placed in the closed position and leakage occurs through the port 136 and into the leak detection unit 138. It is contemplated that the leak detection unit 138 may, for example, be a medium concentration detector or sniffing system with a mass spectrometer. The leak detection unit 138 may also be a thermal micro-leak sensor, which is operative to measure the level of leakage flow through the port 136 in terms of mass versus time or any other device capable of detecting a fluid in the leak detection unit 138.

In some configurations, an access opening 140 is disposed on an opposing side of the leak detection unit 138 from the port 136. The access opening 140 may provide access to the leak detection unit 138 and allow for movement of fluid there through, which may create a bleed valve.

In some embodiments, the leak detection unit 138 may be operably coupled with a programmable logic unit 142 such as a distributed controlled system (DCS) or a central processing unit (CPU). The logic unit 142 is placed into electrical communication with the leak detection unit 138 by a wiring connection 144. The wiring connection 144 allows sensor readings generated by the leak detection unit 138 to be effectively transmitted to the logic unit 142. The logic unit 142 may be configured to compare a leak value generated by the leak detection unit 138 to a set reference value originally programmed into and stored within the logic unit 142. A notification may be generated when the leak value generated is greater than the reference value.

In some examples, the leak detection unit 138 can also be used to simultaneously inject a bonding agent or a cleaning solution into the port 136. The bonding agent, which may be a material such as silicone, may bond with various portions of the seat 32 to seal or assist in preventing further leakage of the seal assembly 24. The cleaning solution may be injected through the port 136 for cleaning various portions of the seal assembly 24. Similarly, in some configurations, the port 136 can be used to inject lubrication or other components.

Examples discussed above present valve seats that are configured to be secured to a valve body with sealing elements arranged to engage (and seal against) the relevant obturator. As such, discussion above may refer to a seat extending radially inwardly to develop a seal with an obturator. In some embodiments, a seat similar to those discussed above can instead be secured to an obturator, such that the seat moves with the obturator to selectively engage (and seal against) the relevant valve body. Accordingly, it will be recognized that discussion above of relative radial orientations of certain components may be reversed in some embodiments.

Thus, embodiments of the present disclosure may offer several advantages over conventional designs. For instance, use of the seal assembly provided herein can be readily tailored to pressure, temperature, corrosive resistance, or other requirements to produce a more robust valve in general. In addition, the seal assembly disclosed herein may seal a space between a valve body and obturator in a single direction or multiple directions. The minimized surface area of the sealing elements that can contact the obturator, or other aspects of certain examples, may also reduce the torque required to move the obturator between a closed position and an open position. Moreover, the seat may be formed from a metallic material, in some instances, that has corrosion resistance properties to provide a known life expectancy and material suitability when compared to various polymeric and elastomeric seals currently used in shut-off valves. Portions of the seal assembly may be formed through subtractive or additive manufacturing to further increase the quality of the assembled seal assembly. The seal assembly provided herein may provide any of the benefits described herein while being manufactured at reduced costs when compared to various seal assemblies currently available, or costing less during the lifespan of the valve due to increased durability or the reusability of various components of the seal assembly.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. An arrangement for providing a seal for a valve, the arrangement comprising:
    a seat having an anchor portion, a connection portion extending radially from the anchor portion, and first and second sealing elements extending from opposing sides of the connection portion;
    first and second cavities respectively defined by the first and second sealing elements and the connection portion;
    first and second energizers respectively arranged on opposing sides of the connection portion within the respective first and second cavities, and respectively positioned between the anchor portion of the seat and the first and second sealing elements, respectively;
    first and second retainers distinct from the seat and respectively positioned within the first and second cavities between the anchor portion of the seat and the respective first or second sealing element;
    a first protrusion defined by the first sealing element and extending radially therefrom; and
    a second protrusion defined by the second sealing element and extending radially therefrom, wherein the first and second energizers define respective first and second engagement axes and a crown portion of each of the first and second protrusions is positioned axially outward of the respective first or second engagement axis,
    wherein the first and second retainers are held in the first and second cavities, respectively, by contact with the first and second energizers and the seat, respectively, within the first and second cavities on opposing sides of the connection portion.

2. The arrangement of claim 1, wherein at least one of the first and second retainers extends to radially overlap its corresponding first or second energizer on two opposing sides of the corresponding first and second energizer.

3. The arrangement of claim 1, wherein the seat is arranged generally radially outward of an obturator and the obturator is configured to selectively engage the seat to inhibit flow through the valve, wherein the connection portion defines an extension axis and at least one of the first and second energizers is configured to be compressed along an energizer compression axis substantially parallel to the extension axis of the connection portion when the obturator engages the seat.

4. The arrangement of claim 1, further comprising:
    first and second protruding retainment features respectively defined by the first and second retainers along a radial end portion thereof and configured to interact, respectively, with corresponding first and second retainment structures defined by the seat.

5. The arrangement of claim 1, wherein a first seat cavity is defined between the first sealing element, the connection portion, and the anchor portion of the seat and a second seat cavity is defined between the second sealing element, the connection portion, and the anchor portion of the seat, the first and second energizers and the first and second retainers arranged, respectively, within the first and second seat cavities.

6. The arrangement of claim 1, wherein first protrusion extends radially a first distance and the second protrusion extends radially a second, smaller distance, and further wherein each of the first and second sealing elements defines a lip axially outward of the first and second protrusions that is configured to radially overlap with an edge of a void in a valve body.

7. The arrangement of claim 1, wherein the first sealing element is formed of a first material and the first retainer is formed of second, different material.

8. The arrangement of claim 1, wherein the first sealing element supports the first energizer at a first radial distance from the anchor portion of the seat and the second sealing element supports the second energizer at a second radial distance from the anchor portion of the seat that is substantially equal to the first radial distance.

9. An arrangement for providing a seal for a valve, the arrangement comprising:
    a seat having an anchor portion, a connection portion extending radially from the anchor portion, and first and second sealing elements extending from opposing sides of the connection portion in a generally axially-aligned orientation;
    first and second energizers respectively arranged on opposing sides of the connection portion, each of the first and second energizers respectively positioned between the first and second sealing elements and the anchor portion of the seat and supported in generally axial alignment relative to each other; and
    first and second retainers that are distinct from the seat and in contact with the first and second energizers, respectively,
    the first and second retainers disposed fully within respective first and second cavities defined by the first and second sealing elements, respectively, and the connection portion, and
    wherein the first sealing element defines a first protrusion extending radially a first distance and the second sealing element defines a second protrusion extending radially a second, smaller distance, and further wherein each of the first and second sealing elements defines a lip axially outward of the first and second protrusions that is configured to radially overlap with an edge of a void in a valve body.

10. The arrangement of claim 9, wherein the first and second retainers are respectively positioned between the first and second energizers and the anchor portion of the seat on opposing sides of the connection portion.

11. The arrangement of claim 10, wherein one of a radially inward or outward surface of the first retainer defines a convex surface and the other of the radially inward or outward surface of the first retainer defines a concave surface.

12. The arrangement of claim 9, wherein the first and second sealing elements are formed from a polymeric material.

13. The arrangement of claim 9, wherein the connection portion defines an extension axis and the first energizer is compressed along an engagement axis substantially parallel to the extension axis.

14. A valve comprising:
   a body defining a body cavity;
   an obturator arranged within the body to selectively inhibit flow through the body;
   a seat having an anchor portion, a radially extending connection portion, and first and second sealing elements each extending from the connection portion arranged within the body cavity;
   a first energizer positioned between the first sealing element and the anchor portion of the seat within a first seat cavity of the seat and a second energizer positioned between the second sealing element and the anchor portion of the seat within a second seat activity; and
   first and second retainers that are distinct from the seat and positioned between the respective first and second energizers and the anchor portion of the seat within the respective first and second seat cavities, the first retainer and the first sealing element each contacting a surface of the body cavity,
   the first sealing element, the first energizer, the first retainer, and the body defining a gap along the seat cavity.

15. The valve of claim 14, wherein the obturator is in contact with the first sealing element in a first position and at least partially separated from the seat in a second position.

16. The valve of claim 14, wherein the first and second energizers are arranged a substantially common radial distance from the anchor portion of the seat.

17. The valve of claim 14, wherein the first sealing element defines a lip extending radially and into a void at least partially defined by the body, the lip at least partly defining the gap.

18. The valve of claim 17, wherein the seat cavity is defined by the first sealing element, a sidewall of the void, and the anchor portion.

* * * * *

UNITED STATES PATENT AND TRADEMARK OFFICE
CERTIFICATE OF CORRECTION

PATENT NO. : 11,028,933 B2  
APPLICATION NO. : 16/254306  
DATED : June 8, 2021  
INVENTOR(S) : Kenneth Heidt Matthews, III et al.

Page 1 of 1

It is certified that error appears in the above-identified patent and that said Letters Patent is hereby corrected as shown below:

In the Claims

Column 16, Claim 6, Line 27, "wherein first" should be --wherein the first--.

Column 18, Claim 14, Line 5, "seat activity" should be --seat cavity--.

Signed and Sealed this  
Third Day of August, 2021

Drew Hirshfeld  
*Performing the Functions and Duties of the*  
*Under Secretary of Commerce for Intellectual Property and*  
*Director of the United States Patent and Trademark Office*